United States Patent [19]
Seymour et al.

[11] 3,928,205

[45] Dec. 23, 1975

[54] REMOVAL OF FLOATING POLLUTANTS

[75] Inventors: Errol V. Seymour; Ray R. Ayers, both of Houston, Tex.

[73] Assignee: Shell Oil Company, Houston, Tex.

[22] Filed: May 17, 1974

[21] Appl. No.: 470,888

Related U.S. Application Data

[63] Continuation of Ser. No. 367,037, June 4, 1973, abandoned, which is a continuation of Ser. No. 147,934, May 28, 1971, abandoned.

[52] U.S. Cl. .......................... 210/242; 210/DIG. 21
[51] Int. Cl.² ........................................... E02B 15/04
[58] Field of Search ......... 210/30, 40, 242, DIG. 21

[56] References Cited
UNITED STATES PATENTS

| | | | |
|---|---|---|---|
| 3,487,927 | 1/1970 | Yahnke | 210/30 |
| 3,508,663 | 4/1970 | Brill | 210/DIG. 21 |
| 3,539,013 | 11/1970 | Smith | 210/242 |
| 3,617,565 | 11/1971 | Fahlrik | 210/40 |
| 3,618,768 | 11/1971 | Brown | 210/242 X |
| 3,668,118 | 6/1972 | Rhodes | 210/30 |
| 3,700,593 | 10/1972 | Bezemer et al. | 210/242 X |
| 3,739,913 | 6/1973 | Bogosian | 210/242 |

*Primary Examiner*—Thomas G. Wyse

[57] ABSTRACT

Apparatus and method for removing a polluting liquid from a water surface, the apparatus being composed of discrete sorbent bodies connected by a tension member and positioned along the water surface in contact with the floating pollutant; the method involving positioning connected discrete sorbent bodies in contact with a floating pollutant, sorbing the pollutant, continuously recovering the sorbent, removing the pollutant from the sorbent, and returning the sorbent to contact with the pollutant on the water surface.

1 Claim, 5 Drawing Figures

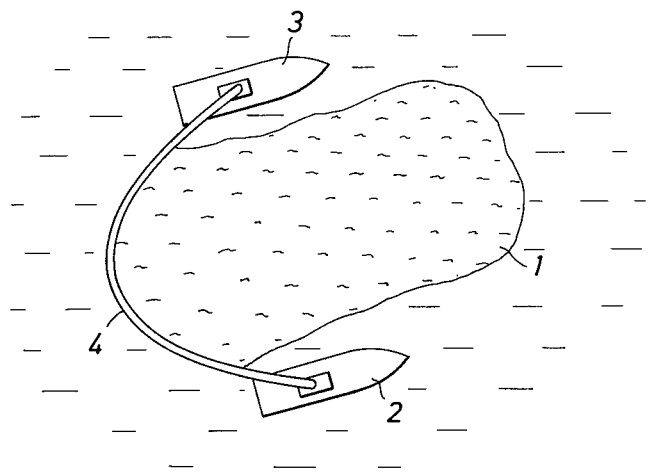
FIG. 1
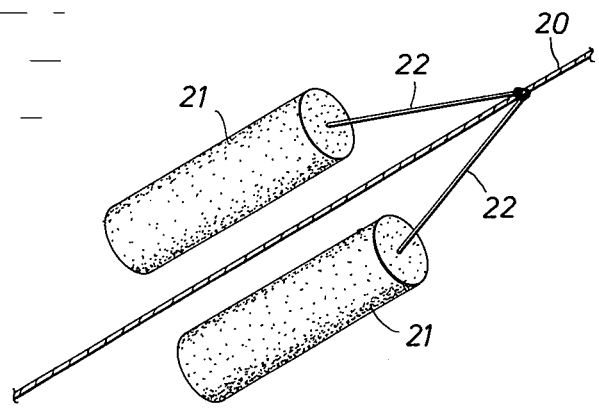
FIG. 2
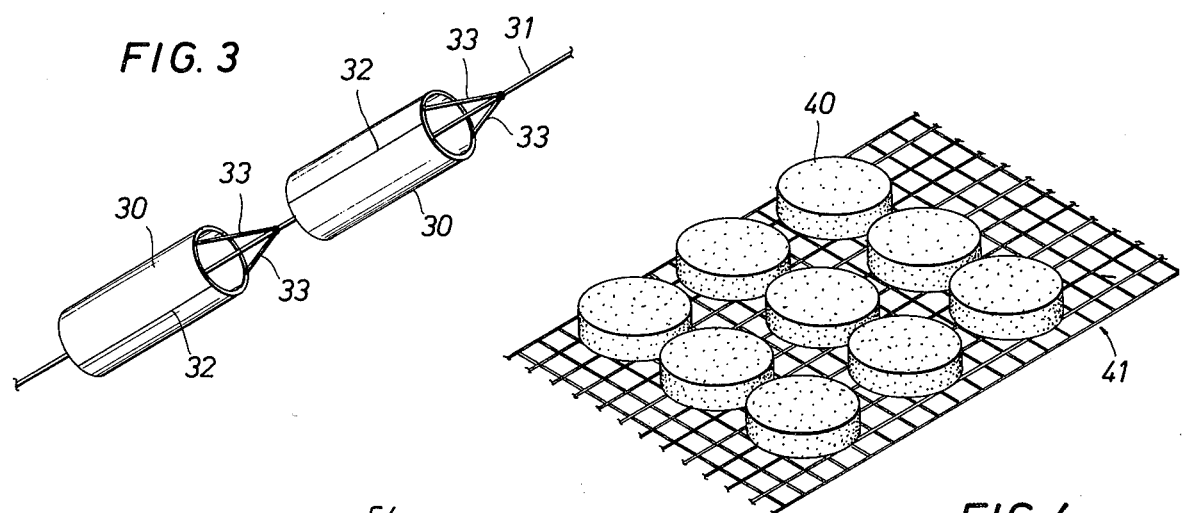
FIG. 3
FIG. 4
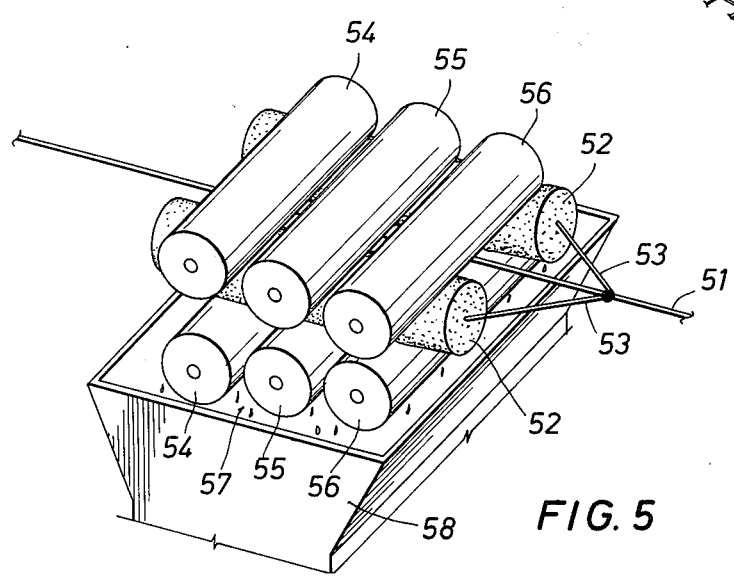
FIG. 5
E.V. Seymour
R.R. Ayers
INVENTORS 3,928,205

REMOVAL OF FLOATING POLLUTANTS

This is a continuation of application Ser. No. 367,037 filed June 4, 1973 and now abandoned, which is a continuation of application Ser. No. 147,934, filed May 28, 1971, and now abandoned.

BACKGROUND OF THE INVENTION

Over most of the navigable waters of the world during recent years oil spills have become problems of great seriousness; oil tankers wrecked at sea have spilled large volumes of oil into the water near beaches and harbors. In addition, leaky fittings and ruptured hoses at shipping terminals and refineries have caused major oil spills in various harbors. As a result, considerable efforts by many parties have been devoted to developing various means to control oil spills. However, such efforts have to date been only modestly successful.

One method employed by the prior art involves use of an endless sorbent belt. The method requires continuously revolving the belt into contact with the oil spill and removing the oil from the belt into a container. Such conventional sorbent belts are built by combining the tensioning and sorbing materials, usually in layers. The belt, normally appearing as a flattened tube, is pulled through the water by a tensioning device which also serves as a wringing device.

Pollutant is imbibed by conventional belt materials almost exclusively through porous flow in which surface tensions predominate. The belts of this material therefore have to be generally quite long in order to provide adequate residence time for absorption/adsorption not only because of slow porous flow but further because of the relatively low surface area per unit mass of the materials. Low surface area is in part due to the combined wringing/pulling techniques which require that the belt cross-section be compact. However, in spite of the compact structure, the concentration of stresses at the wringer, where the belt is simultaneously subjected to the pressure of rollers and the shearing tractions necessary to pull the belt through the water frequently results in a relatively short belt life due to breakage. Consequently, the prior art has not been successful in supplying a reasonably good sorbent belt system.

The present invention overcomes the above described difficulties and provides a successful solution to the problems of the prior art, as will be apparent from the following description thereof.

SUMMARY OF THE INVENTION

The primary purpose of this invention resides in providing an apparatus for the recovery of pollutant spills which can be employed under a wide range of ambient conditions by a method which efficiently removes the spill.

The above purpose has been achieved through the utilization of a sorbent material in the form of connected discrete sorbent bodies.

The process of this invention broadly extends to positioning connected discrete sorbent bodies in contact with the pollutant; sorbing the pollutant; and removing the pollutant from the sorbent bodies.

The apparatus of this invention broadly extends to discrete sorbent bodies; means connecting the bodies; means to position the bodies in contact with the pollutant; and means to remove the pollutant from the bodies.

Within the framework of the above described process and apparatus, the present invention not only solves the above mentioned problems of the prior art, but also achieves further significant advantages as will be apparent from the description of preferred embodiments following.

BRIEF DESCRIPTION OF THE DRAWINGS

FIG. 1 is a schematic plan view showing two vessels collecting a pollutant spill by means of a revolving endless belt.

FIG. 2 is an isometric view showing discrete sorbent pads attached to a tension member.

FIG. 3 is an isometric view showing discrete sorbent cylinders attached to a tension member which passes through the cylinders.

FIG. 4 is an isometric view of a mesh-like tension member having integral discrete sorbent pads.

FIG. 5 is an isometric view showing rollers for squeezing pollutant out of the discrete sorbent pads.

DESCRIPTION OF THE PREFERRED EMBODIMENTS

The recovery of a pollutant spill with an endless belt is particularly attractive because of its efficiency. Thus, the pollutant is continually sorbed by the belt and removed therefrom by a relatively simple operation. In addition, the belt can be employed under a wide range of weather conditions, the only limiting factor being weather too rough for the use of vessels transporting the endless belt. However, as above noted, the endless belt system does suffer some drawbacks. Thus, conventional endless belts generally have a short service life and a low ratio of exposed surface area per unit mass of belt. The present invention overcomes these and other drawbacks. The essence of the invention resides in the utilization of discrete sorbent bodies connected by a tension member to form an endless belt. The advantages of the sorbent belts of this invention over the prior art are readily apparent. Conventional belts use sorbent material as the combined tension member and sorbent surface. Therefore, continuous thick belts of conventional design are torn by the stresses caused by the belt tension, wringing pressure causing sorbent deformation, and abrasion during wringing to extract pollutant. On the other hand, thin belts of conventional design, although less subject to excessive stresses, do not have the sorbing capacity of thicker belts. The belts of the present invention are superior to such conventional belts since (1) deformation of a discrete sorbent pad caused by wringing or squeezing to extract pollutant is not accompanied by the high stress intensity found in continuous sorbents of conventional design, and the durability of the belt is thus enhanced; (2) structural failure of one or more sorbent pads does not constitute failure of the complete belt; (3) the sorbent is not forced to transmit belt tension; (4) the basic belt design of this invention allows utilization of different types of sorbent pads for different applications, for example different pollutants or different grades of the same pollutant; (5) and, the pollutant is imbibed in a shorter residence time because the oil reaches the interior of the belt by free flow, in which surface forces do not predominate, to increase the sorption rate. Free flow, or open flow, is possible where the belt structure, e.g. discrete bodies, allows natural forces such as wind, current and wave forces to predominate over surface tension forces which favor porous flow. The present invention is an improvement over the "sorption only" continuous belt of the prior art inasmuch as the belt of this invention allows a combination of open flow and porous flow to increase sorption rate.

Referring now to FIG. 1 of the drawings, there is shown a pollutant spill on a water surface. It will be understood, of course, that the present invention broadly extends to all floating liquid pollutant, oil or other, and is particularly useful in control of pollutants floating on the ocean. The boundaries of pollutant spill 1 may be limited and even reduced by surface active chemicals such as soaps, amines, alcohols, and organic acids which have the property of spreading extremely rapidly on water until they form a thin, essentially mono molecular film on the water surface which alters the properties of the pollutant/water interface (such films are reviewed by W. D. Garrett, Joint API/FW-PCA Conference On Oil Spills, Dec. 12–17, 1970). Vessels 2 and 3 transport and continuously revolve an endless sorbent belt 4 to recover the oil spill 1 along with any surface active chemicals employed around the boundary of the spill.

In FIG. 2 is shown a sorbent belt composed of a tension member 20 to which is attached discrete sorbent pads 21 by means of lines 22. While two pads are shown attached to the tension member at a single location, it is of course evident that one, three or more pads could be used similarly. Also, while the pads are shown as being cylindrical, other shapes are suitable, for example rectangular or spherical, without departing from the scope of the invention.

A second embodiment of the invention is shown in FIG. 3. In accordance with this embodiment, there is provided a sorbent tube 30 which is an open cylinder through which tension member 31 passes. The tube has a lateral split 32 so that it may easily be taken off of tension member 31 in the event of its failure. The tube is connected to the tension member by lines 33. The sorbent bodies 30 are depicted as cylindrical but other shapes, as above noted, may be employed without departing from the scope of the invention.

FIG. 4 discloses a third embodiment of the invention. In this embodiment discrete sorbent pads 40 are attached to a mesh-like or a grid-like tension and reinforcing member 41. The purpose of member 41 is to maintain a combined free flow/porous flow system. By attaching sorbents to an elastic, semirigid mesh structure a free flow channel is maintained between sorbents. The discrete pads, if elastomeric material for example, may be molded integrally with the tension member 41. Again, the shape of the sorbent pads is not critical, the ones shown being in tabular form, inasmuch as other forms may be used.

While the above connecting means 20, 31 and 41 are referred to as tension members, this is not to infer that such members are kept in tension for protracted periods as would be the case where the member is an endless belt which is continuously revolved. Instead, the connecting members along with the discrete sorbent bodies may be deposited on the pollutant spill and allowed to remain indefinitely until picked up later.

In FIG. 5 is shown one method of removing pollutant from the sorbent bodies. Tensioning member 51 having discrete sorbent pads 52 attached thereto by means of lines 53 is pulled between a series of rotatable parallel cylinders or rollers 54, 55 and 56 which are spaced consecutively closer together so that pollutant is gradually removed over an extended squeezing period, thereby reducing pore pressure generated by the squeezing action which might otherwise damage the belt. Pollutant 57 is squeezed from the sorbent pads and falls into a funnel and containment means 58. Alternatively, the squeezing means may be a pair of endless belts (not shown) each rotatable around a series of cylinders and mutually arranged in such a way that a slot-shaped passage of decreasing height is left through which the sorbent body to be squeezed is passed. Preferably, the cylinders or the pair of endless belts are such that the sorbent is squeezed up to at most two-thirds of maximum squeezing capacity. By restricting the squeeze pressure so that not all of the sorbed pollutant is recovered, damage to the porous body is reduced which lengthens the period in which such a body can be used without being replaced. It is, of course, evident that other means can be employed to remove pollutant from the discrete sorbent bodies which are equally as good as that depicted. Thus, the pollutant can be removed by wringing, by the use of solvents, or combinations of squeezing, wringing, and solvent removal.

The preferred means for deploying an endless sorbent belt in the open sea is shown in FIG. 1 as two vessels. However, it is to be understood that the invention is adaptable to collecting pollutant from a waterway, such as a river, where it might be convenient to substitute a shore installation for one or both vessels. It is, of course, possible to make use of two vessels on a waterway as in the open sea.

It is also possible to use a collecting barge and a guiding boat instead of two boats each collecting the pollutant. In some cases it may be possible to use only one boat, without a barge or shore installation, where the sorbent body can be spread over the water surface by wind and/or currents.

Preferably, the sorbent of this invention has an average porosity of at least about 80 percent and a density of less than 1.00 so that it will float on water. Of course, it is not necessary that the sorbent float as special means may be provided to keep it from sinking. Preferably, however, a foamed organic polymer is employed which easily floats. Foamed polyurethane is the most preferred material.

The apparatus and method of the invention may be used for any purpose in cases where a pollutant liquid floating on water is to be recovered. The present method, while directed principally to dealing with large scale oil pollution, may also be used in skimming oil from oil field and refinery drains.

We claim as our invention:

1. An apparatus for removing a floating liquid pollutant from water, comprising:
   a tension member;
   a sorbent tube shaped as an open cylinder through which the tension member passes and having a lateral split so that it may be removed off the tension member in the event of failure of the sorbent;
   lines connecting the tube to the tension member;
   means to deploy the tension member to position the sorbent tubes in contact with the pollutant; and
   means to remove the pollutant from the sorbent.

* * * * *